(12) United States Patent
Mu et al.

(10) Patent No.: US 11,867,514 B2
(45) Date of Patent: Jan. 9, 2024

(54) NAVIGATION SYSTEM WITH INDEPENDENT POSITIONING MECHANISM AND METHOD OF OPERATION THEREOF

(71) Applicant: TeleNav, Inc., Santa Clara, CA (US)

(72) Inventors: Mengchao Mu, Shanghai (CN); Hui Fang, Shanghai (CN); Congmin Bai, Shanghai (CN)

(73) Assignee: Telenav, Inc., Santa Clara, CA (US)

( * ) Notice: Subject to any disclaimer, the term of this patent is extended or adjusted under 35 U.S.C. 154(b) by 127 days.

(21) Appl. No.: 17/484,274

(22) Filed: Sep. 24, 2021

(65) Prior Publication Data
US 2023/0115501 A1    Apr. 13, 2023

(51) Int. Cl.
| | | |
|---|---|---|
| G01C 1/00 | (2006.01) | |
| G01C 21/30 | (2006.01) | |
| G06T 7/70 | (2017.01) | |
| G01S 19/48 | (2010.01) | |
| G01C 21/36 | (2006.01) | |
| G06T 7/60 | (2017.01) | |

(52) U.S. Cl.
CPC ......... G01C 21/30 (2013.01); G01C 21/3667 (2013.01); G01S 19/485 (2020.05); G06T 7/60 (2013.01); G06T 7/70 (2017.01); *G06T 2207/30252* (2013.01)

(58) Field of Classification Search
CPC ...... G01C 21/30; G01C 21/3667; G06T 7/70; G06T 7/60; G06T 2207/30252; G01S 19/485
USPC ........................................................ 701/431
See application file for complete search history.

(56) References Cited

U.S. PATENT DOCUMENTS

| | | | |
|---|---|---|---|
| 11,125,566 B2 | 9/2021 | Cui et al. | |
| 2012/0176491 A1* | 7/2012 | Garin ...................... | G01S 19/49 348/113 |
| 2016/0192154 A1* | 6/2016 | Modica ..................... | G01S 5/16 455/456.1 |
| 2017/0016740 A1 | 1/2017 | Cui et al. | |

(Continued)

OTHER PUBLICATIONS

Yuan, Jin-Zhao, et al. "Estimation of Vehicle Pose and Position with Monocular Camera at Urban Road Intersections." Journal of Computer Science and Technology, vol. 32, No. 6, Nov. 2017, pp. 1150-1161. (Year: 2017).*

*Primary Examiner* — Tyler J Lee
*Assistant Examiner* — Tiffany P Ohman
(74) *Attorney, Agent, or Firm* — Perspectives Law Group, Corp.

(57) ABSTRACT

A method of operation of a navigation system includes: determining a geographic location, of a vehicle, while a global positioning location is blocked by an obstruction and the geographic location is from an in-vehicle location sensor in the vehicle; extracting an image line from a surrounding image with an artificial intelligence model and the surrounding image is from an in-vehicle image sensor in the vehicle; transforming an image coordinate of the image line to a world coordinate of a HD map local storage based on the geographic location; extracting a map line from the HD map local storage based on the world coordinate; determining a pose relationship between the image line and the map line paired as either horizontal or vertical; generating a map-related location for the vehicle based the geographic location and the pose relationship; and communicating the map-related location for displaying on a user interface.

20 Claims, 8 Drawing Sheets

(56) References Cited

U.S. PATENT DOCUMENTS

| | | | |
|---|---|---|---|
| 2018/0364349 A1* | 12/2018 | Kudrynski | G01C 21/367 |
| 2021/0192956 A1 | 6/2021 | Takeda | |
| 2021/0199437 A1 | 7/2021 | Breed et al. | |
| 2021/0207976 A1 | 7/2021 | Xia et al. | |
| 2021/0223046 A1 | 7/2021 | Li et al. | |
| 2021/0327084 A1* | 10/2021 | Ivanov | G06V 10/56 |

* cited by examiner

NAVIGATION SYSTEM WITH INDEPENDENT POSITIONING MECHANISM AND METHOD OF OPERATION THEREOF

TECHNICAL FIELD

An embodiment of the present invention relates generally to a navigation system, and more particularly to a system with an independent positioning mechanism.

BACKGROUND ART

With the advent of autonomous vehicles, a number of deficiencies were discovered in the mapping strategy used by most location-based navigation systems. The reliance on satellite based global positioning systems to determine the accurate location has its drawbacks.

As the number of autonomous vehicles on the roads increases, relying solely on satellite-based navigation, accurate location and positioning becomes unreliable. The accuracy required to maneuver the autonomous vehicles must be supported for maneuvering in tight spaces where an inch either way could mean an accident.

Thus, a need still remains for a navigation system with an independent positioning mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: determining a geographic location, of a vehicle, while a global positioning location is blocked by an obstruction and the geographic location is from an in-vehicle location sensor in the vehicle; extracting an image line from a surrounding image with an artificial intelligence model and the surrounding image is from an in-vehicle image sensor in the vehicle; transforming an image coordinate of the image line to a world coordinate of a high definition (HD) map local storage based on the geographic location; extracting a map line from the HD map local storage based on the world coordinate; determining a pose relationship between the image line and the map line paired as either horizontal or vertical; generating a map-related location for the vehicle based the geographic location and the pose relationship; and communicating the map-related location for displaying on a user interface.

An embodiment of the present invention provides a navigation system, including a control circuit configured to: determine a geographic location, of a vehicle, while a global positioning location is blocked by an obstruction and the geographic location is from an in-vehicle location sensor in the vehicle, extract an image line from a surrounding image with an artificial intelligence model and the surrounding image is from an in-vehicle image sensor in the vehicle, transform an image coordinate of the image line to a world coordinate of a high definition (HD) map local storage based on the geographic location, extract a map line from the HD map local storage based on the world coordinate, determine a pose relationship between the image line and the map line paired as either horizontal or vertical, and generate a map-related location for the vehicle based the geographic location and the pose relationship; and an interface circuit configured to communicate the map-related location for display on a user interface.

An embodiment of the present invention provides a non-transitory computer readable medium including instructions for a navigation system, including: determining a geographic location, of a vehicle, while a global positioning location is blocked by an obstruction and the geographic location is from an in-vehicle location sensor in the vehicle; extracting an image line from a surrounding image with an artificial intelligence model and the surrounding image is from an in-vehicle image sensor in the vehicle; transforming an image coordinate of the image line to a world coordinate of a high definition (HD) map local storage based on the geographic location; extracting a map line from the HD map local storage based on the world coordinate; determining a pose relationship between the image line and the map line paired as either horizontal or vertical; generating a map-related location for the vehicle based the geographic location and the pose relationship; and communicating the map-related location for displaying on a user interface.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
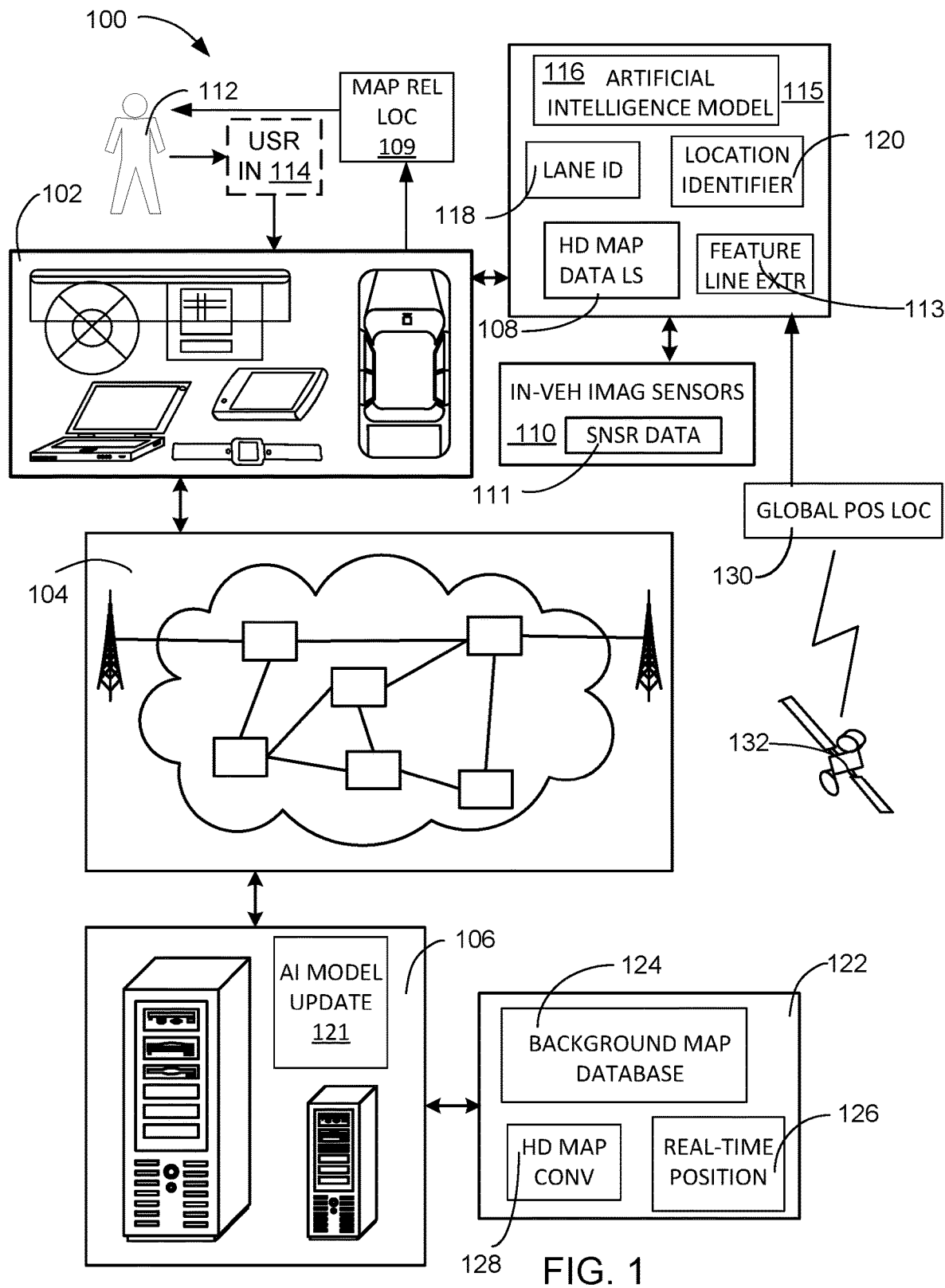
FIG. 1 is a block diagram of a navigation system with an independent positioning mechanism in an embodiment of the present invention.

The following embodiments can accurately identify lanes and objects, which enables vehicle movement control for operating or controlling physical movement of a vehicle. The vehicle movement control can be based on a driver assisted or an autonomous vehicle driving process that is safe and reliable due to the accuracy of the lane and object detection.

The vehicle movement control can further be based on accurately identifying lane position, objects, and restrictions to assure the driver assisted or autonomous vehicle can be completed without risk of damage to the vehicle or any adjacent objects or property.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y, Z); where X and Y and Z are three coordinates, such as latitude, longitude, and elevation that define the geographic location, i.e., a position of a vehicle.

The term "module" referred to herein can include or be implemented as or include software running on specialized hardware, hardware, or a combination thereof in the present invention in accordance with the context in which the term is used. For example, the software can be machine code, firmware, embedded code, and application software. The software can also include a function, a call to a function, a code block, or a combination thereof.

Also, for example, the hardware can be gates, circuitry, processor, computer, integrated circuit, integrated circuit cores, memory devices, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "unit" is written in the system claims section below, the "unit" is deemed to include hardware circuitry for the purposes and the scope of the system claims.

The units in the following description of the embodiments can be coupled or attached to one another as described or as shown. The coupling or attachment can be direct or indirect without or with intervening items between coupled or attached modules or units. The coupling or attachment can be by physical contact or by communication between modules or units, such as wireless communication.

The term "obstructed" or "obstruction" as used in the specification and the claims has the meaning of an object that blocks a region or location from a global positioning system access including objects such as a canyon wall, mountain ranges, a skyscraper building, walls of an indoor parking garage, a tunnel, an electrical storm, or extreme weather pattern.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown a block diagram of a navigation system 100 with an independent positioning mechanism in an embodiment of the present invention. The navigation system 100 can include a first device 102, such as a vehicle capable of acting as a client or a server, connected to a second device 106, such as a client or server.

The navigation system 100 can include a system for identifying an independent position based on fusion of multiple sources to reconcile and quickly identify the current location to assist in making lane change or route change decisions. The first device 102 can communicate with the second device 106 through a network 104, such as a wireless or wired network.

For example, the first device 102 can be of any of a variety of computing devices, such as a cellular phone, personal digital assistant, a notebook computer, a wearable device, internet of things (IoT) device, automotive telematics navigation system, or other multi-functional device. Also, for example, the first device 102 can include a device or a sub-system, an autonomous or self-maneuvering vehicle or object, a driver assisted vehicle, a remote-controlled vehicle or object, or a combination thereof.

The first device 102 can couple, either directly or indirectly, to the network 104 to communicate with the second device 106 or can be a stand-alone device. The first device 102 can further be separate form or incorporated with a vehicle, such as a car, truck, bus, motorcycle, or a drone.

For illustrative purposes, the navigation system 100 is described with the first device 102 as a vehicle that includes a telematic system, although it is understood that the first device 102 can be different types of devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device.

Also, for illustrative purposes, the navigation system 100 is described with the second device 106 as a computing device, although it is understood that the second device 106 can be different types of devices. Also, for illustrative purposes, the navigation system 100 is shown with the second device 106 and the first device 102 as endpoints of the network 104, although it is understood that the navigation system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The first device 102 can be coupled to in-vehicle image sensors 110 and a high definition (HD) map data local storage 108. The in-vehicle image sensors 110 are optical sensors positioned on the first device 102, configured to monitor, observe, record, or a combination thereof the surroundings of the first device 102. The in-vehicle image sensors 110 can be monocular cameras, stereo cameras, video cameras, or a combination thereof. The HD map data local storage 108 provides a non-transitory storage medium to store a sensor data stream 111 captured by the in-vehicle image sensors 110. A feature line extract 113 can be implemented as software executing on a specific hardware set. The feature line extract 113 can be executed within two banks of the memory, coupled to or within the HD map data local storage 108, capable of storing feature lines observed by the in-vehicle image sensors 110. The feature line extract 113 can analyze the sensor data stream 111, with an artificial intelligence model 116, in order to identify the traffic lanes and crosswalks in the immediate vicinity. Once processed, the sensor data stream 111 can be serially compared to the content of the HD map data local storage 108 in order to identify the location of the first device 102.

The artificial intelligence model 116 can be a software or hardware module capable of matching lane identification lines on the sensor data stream 111 to identify the feature lines extracted from the in-vehicle image sensors 110.

For example, the HD map data local storage 108 can be implemented in a number of ways, such as a non-volatile storage device, such as a hard disk drive, a solid state storage device (SSD), a FLASH memory card, or a combination thereof, capable of storing a high definition (HD) map of the area travelled by the first device 102.

The first device 102 can be coupled to an independent positioning module 115 that can perform a pixel evaluation, of the sensor data stream 111. The independent positioning module 115 can implemented in software running on specialized hardware, full hardware, or a combination thereof. The independent positioning module 115 can maintain a map-related location 109, through pixel analysis of the sensor data stream 111, when a global positioning location 130 is not available. The independent positioning module 115 can be configured to analyze a photographic scene to identify vehicular traffic in front of and around the first device 102 as well as the physical location of the first device 102. The independent positioning module 115 can process the sensor data stream 111, including sampled frames of the sensor data stream 111, by the feature line extract 113 in order to identify feature lines, such as lane markers and crosswalks, for the scene captured by the in-vehicle image sensors 110. During a training process, the first device 102 can upload the sensor data stream 111 to the second device 106 for further analysis or to generate the artificial intelligence model 116 to improve the detection of the location of the first device 102.

The independent positioning module 115 can include the artificial intelligence model 116, a lane identification module 118, and a location identifier module 120 that can generate the map-related location 109. The map-related location 109 can be the location of the first device 102 as generated from the global positioning location 130 or the independent positioning module 115 when the global positioning location 130 is not available.

The location identifier module 120 can be software or hardware module capable of determining the map-related location 109 based on the grouping of sampled frames passed to the artificial intelligence model 116, which can be stored in the first device 102 or the second device 106. The location identifier module 120 can receive input from the lane identification module 118, which provides the identification of lane lines and crosswalks represented in the sensor data stream 111 and identified by the artificial intelligence model 116. The sensor data stream 111 can be analyzed by submitting the scan data portion of the sensor data stream 111 to the artificial intelligence model 116. It is understood that other portions of the sensor data stream 111 including time, real world position, and extrinsic parameters of the in-vehicle image sensor 110 can be stored in the first device 102 or the second device 106 for subsequent operations.

The lane identification module 118 can be software or hardware module capable of selecting samples of the frames presented by the sensor data stream 111. The lane identification module 118 can include a set of parameters for identifying how many and which of the sampled frames are presented to the artificial intelligence model 116. The results of the analysis of the lane identification module 118 can be stored in the storage circuitry of the first device 102 or the second device 106. It is understood that the location identifier module 120 can converge the output of the artificial intelligence model 116 from the sensor data stream 111 with a representation of a high definition (HD) proximity map in order to identify the map-related location 109.

The location identifier module 120 can output the map-related location 109 for displaying on the first device 102. The map-related location 109 can get accurate and stable location, a position fusion module is used to fuse the map-related location and the IMU-estimated location to provide sufficient accuracy to provide the vehicle with maneuvering instructions to increase speed, decrease speed, change lanes, change position within a lane, or access a parking space.

The HD map data local storage 108 can be located in the first device 102 and coupled to the in-vehicle image sensors 110 to store a sensor data stream 111 and adjustments to the artificial intelligence model 116 returned from the second device 106 during a training period or requested updates. The first device 102 can assemble frames from the in-vehicle image sensors 110 to generate the sensor data stream 111 for analysis. The sensor data stream 111 can provide the information captured by the in-vehicle image sensors 110 and recorded in the HD map data local storage 108. During a training process, the first device 102 can transmit a request for an artificial intelligence (AI) model update 121 over the network 104 to the second device 106. The artificial intelligence model update 121 can be performed while the global positioning location is available, which allows correlation of the map-related location 109 with the position from a global positioning system. The second device 106 can refine the artificial intelligence model 116 in order to more accurately calculate the map-related location 109. The artificial intelligence model update 121 can be sent to the first device 102 for inclusion in the navigation process.

The navigation system 100 can be operated by a user 112. The user 112 can include a person or an entity accessing or utilizing the navigation system 100 or a device therein. For example, the user 112 can include a person owning or operating the first device 102, a service, or a combination thereof. Also, for example, the user 112 can access or utilize the second device 106 through the first device 102, a service, or a combination thereof.

The navigation system 100 can further process a direct user input 114 from the user 112. The direct user input 114 can include a request for navigation assistance, location of a point of interest, parking assistance, restaurant assistance, lodging assistance, location of gas stations, event reservations, or a combination thereof. The direct user input 114 can be provided by or from the user 112 directly to or directly on the first device 102. The direct user input 114 can include the input or the stimulus directly for or related to corresponding software, application, feature, or a combination thereof.

The navigation system 100 can implement one or more embodiments without the direct user input 114. The navigation system 100 can further implement one or more embodiments using the direct user input 114 unrelated thereto. The direct user input 114 can include an increase in speed, a decrease in speed, a change of position within a lane, or changing lanes as prompted by the user 112.

The second device 106 can transmit the artificial intelligence model update 121 periodically or when the first device 102 requests service for route planning or identification or points-of-interest along the current roadway. The second device 106 can distribute the artificial intelligence model update 121 during a training period and as requested by the first device 102.

The second device 106 can refine the artificial intelligence model update 121 and generate refinements to the artificial intelligence model 116 for use by the first device 102 during the training period. By way of an example, the second device 106 can apply the artificial intelligence model update 121 to a map verification manager 122. The map verification manager 122 can operate the artificial intelligence model update 121 in order to verify a background map database 124, a real-time position model 126, and a high definition map convergence model 128.

The background map database 124 can include a pictorial display of the roads, highways, and intersections for a given region. The real-time position model 126 can apply the artificial intelligence model update 121 requested by the first device 102 to the background map database 124 and the samples from sensor data stream 111 in order to confirm the accuracy of the navigation system 100. The high definition map convergence model 128 can verify that the artificial intelligence model update 121 can quickly and accurately merge the samples from sensor data stream 111 with the data from the background map database 124 in order to identify the map-related position 109. It is understood that the global positioning location 130 is used in the verification of accuracy of the map-related position 109, it is not used in the calculation of the map-related position 109. The global positioning location 130 is provided by the global positioning system 132. The global positioning location 130 is susceptible to being blocked by an obstruction, such as a canyon, a mountain, a skyscraper, a tunnel, or an indoor parking structure.

It has been discovered that the navigation system 100 can reliably identify the map-related location 109 in order to provide real-time updates of the actual position of the first device 102 when the global positioning location 130 is not available. The map-related location 109 can be normalized over a fixed period of time in order to produce the artificial intelligence model update 121. By sending the artificial intelligence model update 121 from the second device 106, a communication can be distributed to other users of the navigation system 100 for route planning, traffic or accident warnings, lane selection alerts, construction warnings, and the like. The navigation system 100 can improve safety of the first device 102 by providing real-time traffic updates, lane suggestions, alternate routes, or a combination thereof. The navigation system 100 can seamlessly maintain accurate positioning information through the map-related location 109 when the global positioning location 130 has been obstructed.

Figure 2:
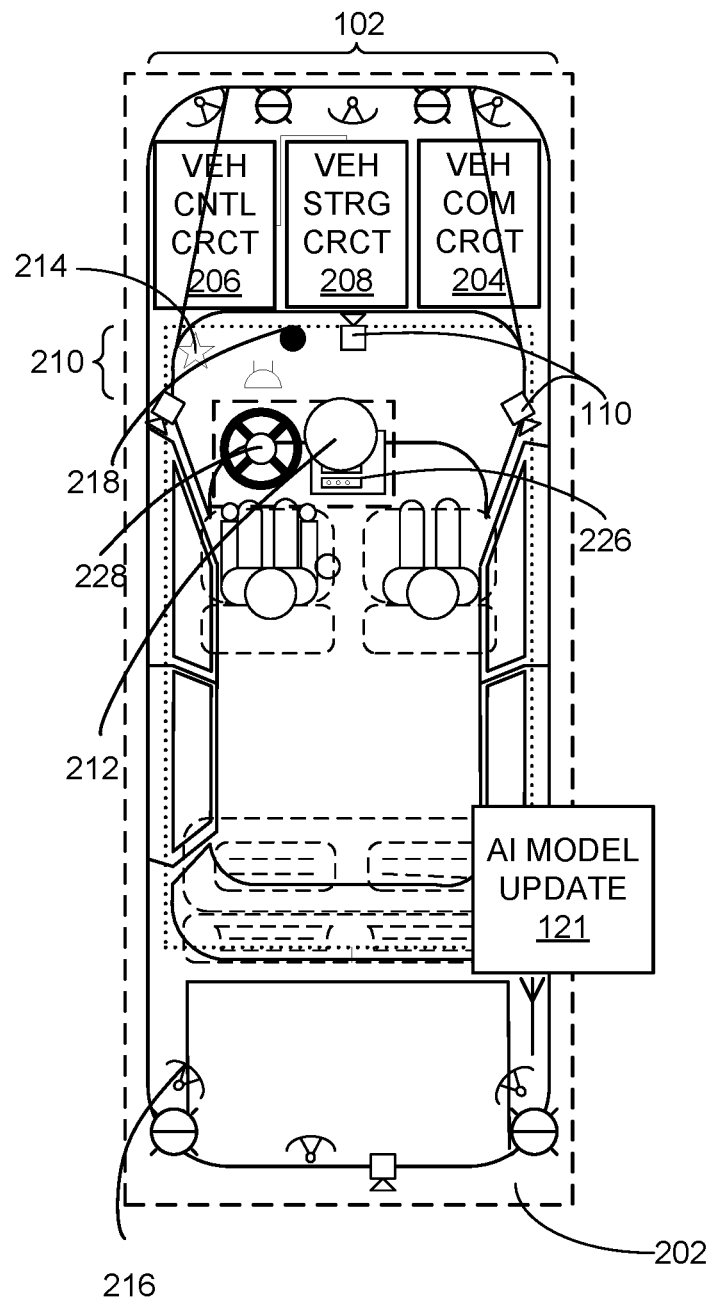
FIG. 2 is an example of a schematic view of a first device configured to provide the independent positioning mechanism in an embodiment.

Referring now to FIG. 2, therein is shown an example a top plan view illustration of a vehicle 201 for the navigation system 100 of FIG. 1. The navigation system 100 can include or interact with the first device 102. By way of an example, the vehicle 201 can be the first device 102. For this discussion the first device 102 is considered to be the vehicle 201.

The first device 102 can be an object or a machine used for transporting people or goods capable of automatically maneuvering or operating the object or the machine. The first device 102 can include vehicles accessible by the user 112 of FIG. 1 for control, maneuver, operation, or a combination thereof. For example, the first device 102 can include a car, a truck, a cart, a drone, or a combination thereof.

The first device 102 can further be controlled or maneuvered without the direct user input 114 of FIG. 1 corresponding to the maneuver or the movement. For example, the first device 102 can include a self-driving vehicle, or a vehicle with automatic maneuvering features, such as smart cruise control or preventative breaking. The first device 102 can include a smart cruise control feature, capable of setting and adjusting the travel speed of the first device 102 without the direct user input 114. Also, for example, the first device 102 can be controlled or maneuvered by the navigation system 100, including controlling or setting a cruising speed, lane position, or other physical maneuvers or movements of the first device 102.

The navigation system 100 can further utilize map-related location 109 from one or more vehicles or devices. The artificial intelligence model update 121 can include information regarding identification of lane markings observed by the first device 102. The artificial intelligence model update 121 can be an enhancement for the artificial intelligence model 116 of FIG. 1 for processing the sensor data stream 111 of FIG. 1 of the in-vehicle image sensor 110 by the first device 102.

The first device 102 or other vehicles interfacing with the navigation system 100 can include a device, a circuit, one or more specific sensors, such as environmental sensors 210, or a combination thereof for providing assistance or additional information to the user 112 controlling, maneuvering, or operating the first device 102. The first device 102 or any other vehicles can include a vehicle communication circuit 204, a vehicle control circuit 206, a vehicle storage circuit 208, other interfaces, or a combination thereof.

The vehicle storage circuit 208 can include a functional unit or circuit integral to the corresponding first device 102 and configured to store and recall information. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the navigation system 100 or vehicle manufacturer, or a combination thereof.

The vehicle control circuit 206 can include a function unit or circuit integral to the first device 102 and configured to execute or implement instructions. The vehicle control circuit 206 can execute or implement the vehicle software to provide the intelligence of the vehicle 201, the navigation system 100, or a combination thereof.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof The vehicle communication circuit 204 can include a function unit or circuit integral to the vehicle 201, such as the first device 102, another vehicle, or a combination thereof. The vehicle communication circuit 204 can be configured to enable external communication to and from the vehicle 201. For example, the vehicle communication circuit 204 can permit the first device 102 to communicate with the second device 106 of FIG. 1.

The vehicle communication circuit 204 can also function as a communication hub allowing the vehicle 201 to function as part of the network 104 of FIG. 1 and not limited to be an end point or terminal circuit to the network 104. The vehicle communication circuit 204 can include active and passive components, such as microelectronics or an antenna, for interaction with the network 104. For example, the vehicle communication circuit 204 can include a modem, a transmitter, a receiver, a port, a connector, or a combination thereof for wired communication, wireless communication, or a combination thereof.

The vehicle communication circuit 204 can couple with the network 104 to send or receive information directly between the vehicle communication circuit 204 and the second device 106 as end points of the communication, such as for direct line-of-sight communication or peer-to-peer communication. The vehicle communication circuit 204 can further couple with the network 104 to send or receive information through a server or another intermediate device in between endpoints of the communication.

The first device 102 or other vehicle 201 can further include various interfaces. The first device 102 can include one or more interfaces for interaction or internal communication between functional units or circuits of the first device 102. For example, the first device 102 can include one or more interfaces, such as drivers, firmware, wire connections or buses, protocols, or a combination thereof, for the vehicle storage circuit 208, the vehicle control circuit 206, or a combination thereof.

The first device 102 or the other vehicles can further include one or more interfaces for interaction with an occupant, an operator or a driver, a passenger, or a combination thereof relative to the vehicle 201. For example, the first device 102 or the other vehicles can include a user interface 212 including input or output devices or circuits, such as a screen or touch screen, a speaker, a microphone, a keyboard or other input devices, an instrument panel, or a combination thereof.

The first device 102 can further include one or more interfaces along with switches or actuators for physically controlling movable components of the first device 102. For example, the first device 102 can include the one or more interfaces along with the controlling mechanisms to physically perform and control the maneuvering of the first device 102, such as for automatic driving, smart cruise control, or maneuvering features.

The functional units or circuits in the first device 102 can work individually and independently of the other functional units or circuits. The first device 102 can work individually and independently from the network 104, the second device 106, other devices or vehicles, or a combination thereof.

The functional units or circuits described above can be implemented in hardware. For example, one or more of the functional units or circuits can be implemented using a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device or a circuit for detecting or identifying environment of the first device 102. The environmental sensors 210 can detect, identify, determine, or a combination thereof, such as for status, surroundings or movement for the vehicle 201. The environmental sensors 210 can detect, identify, determine, or a combination thereof for environment within a cabin of the vehicle 201, an environment external to and surrounding the vehicle 201, or a combination thereof. The environmental sensors 210 can be implement for the first device 102.

For example, the environmental sensors 210 can include a user interface 212, an in-vehicle image sensor 110, an in-vehicle location sensor 214, a radar sensor 216, a global positioning system (GPS) location sensor 218, or a combination thereof. The user interface 212 can include a projector, a video screen, a touch screen, a speaker, or any combination thereof. The user interface 212 can display the map-related location 109 of FIG. 1, a planned route, lane suggestions, speed warnings, vehicle system alerts and combinations thereof.

The in-vehicle image sensor 110 can include a sensor for detecting or determining visual information representing the environment external to and surrounding of the vehicle 201. The in-vehicle image sensor 110 can include a camera attached to or integral with the vehicle 201 or device. For example, the in-vehicle image sensor 110 can include a camera, such as forward facing camera, a video camera, a rear-view or back-up camera, a side-view or a blind-spot camera, or a combination thereof. Also, for example, the in-vehicle image sensor 110 can include an infrared sensor, a night vision video camera, or a night vision sensor.

The in-vehicle image sensor 110 can further include a camera on the first device 102 or another user device of the user 112 connected to and interacting with the first device 102, such as a vehicle. The in-vehicle image sensor 110 can further include a cabin camera for detecting or determining visual information inside the vehicle or cabin of the vehicle.

The in-vehicle location sensor 214 can be a combination of software executed on a specific hardware to implement an inertial measurement unit (IMU). The in-vehicle location sensor 214 can monitor the global positioning location 130 of FIG. 1 as the output of the global positioning system (GPS) location sensor 218 to maintain a copy of the geographic location 226. The geographic location 226 can indicate the position of the vehicle 201 on the Earth. In the event the global positioning system (GPS) location sensor 218 is obstructed or hampered by the obstruction 202 and the global positioning location 130 is not available, the in-vehicle location sensor 214 can update the map-related location 109 based on the geographic location 226 in order to maintain position awareness of the vehicle 201.

The in-vehicle location sensor 214 can include gyroscopes, accelerometers, and magnetometers, for monitoring the movement of the vehicle 201 when the obstruction 202 prevents the operation of the global positioning system (GPS) location sensor 218. The in-vehicle location sensor 214 can only maintain an accurate position of the vehicle 201 for a short time and must be supported by other means. The obstruction 202 is shown to surround the vehicle 201, but it is understood that the obstruction 202 can cover areas of several square miles and can impact several of the vehicle 201 concurrently. By way of a specific example, the obstruction 202 can be caused by skyscraper buildings in downtown New York City or an indoor parking garage.

The radar sensor 216 can include an object-detection system, device, or circuit. The radar sensor 216 can determine or identify an existence of an object or a target, such as an obstacle or another vehicle, external to the corresponding device or vehicle, a relative location or a distance between the object or the target and the corresponding device or vehicle, or a combination thereof.

The radar sensor 216 can utilize radio waves to determine or identify an existence of the object or the target, the relative location or a distance relative to the first device 102 or other corresponding device or vehicle, or a combination thereof. For example, the radar sensor 216 can include a proximity sensor or warning system, such as for an area in front of, behind, adjacent to or on a side of, or a combination thereof geographically or physically relative to the first device 102.

The GPS location sensor 218 can be a sensor for identifying or calculating the geographic location 226 of the vehicle 201 or device, determining a movement or speed of the vehicle 201 or device, or a combination thereof. The GPS location sensor 218 can include an accelerometer, a speedometer, a Global Positioning System (GPS) receiver or device, a gyroscope or a compass, or a combination thereof. The first device 102 can include the environmental sensors 210 other than or in addition to the GPS location sensor 218. The GPS location sensor 218 provides the global positioning location 130 and can be susceptible to the obstruction 202 and requires a clear line-of-sight to multiple satellites (not shown) or cell towers for proper operation.

The navigation system 100 can use one or more of the in-vehicle image sensors 110 corresponding to one or more devices, one or more vehicles, or a combination thereof to generate the map-related location 109 describing or representing information regarding the environment surrounding the corresponding device or vehicle. The map-related location 109 can be further processed with the vehicle control circuit 206, stored in the vehicle storage circuit 208, communicated to another device or vehicle through the vehicle communication circuit 204, or a combination thereof. The in-vehicle image sensors 110 can support the in-vehicle location sensor 214 in order to maintain an accurate version of the map-related location 109.

As a more specific example, the vehicle communication circuit 204, the vehicle control circuit 206, the vehicle storage circuit 208, the in-vehicle image sensors 110, one or more interfaces, or a combination thereof can be included in or make up the first device 102.

The navigation system 100 can utilize the map-related location 109 from devices, vehicles, or a combination thereof to dynamically determine and map traffic and road conditions in a geographical area along with vehicles, pedestrians, objects, or a combination thereof within the geographical area. As a more specific example, the navigation system 100 can use the map-related location 109 to dynamically control the vehicle 201. The navigation system 100 can further utilize the map-related location 109 to control movement of the first device 102 at a lane level of granularity.

The navigation system 100 can provide the vehicle movement control 228 as a suggestion to the user 112 for maneuvering or operating the first device 102. Details regarding the utilization and processing of the map-related location 109 are discussed below.

The navigation system 100 can process and generate vehicle movement control 228 for controlling or maneuvering the first device 102. The vehicle movement control 228 is an instruction, a signal, a process, a method, a mechanism, or a combination thereof directing or controlling physical movement or travel of the first device 102.

The navigation system 100 can communicate the artificial intelligence model update 121 to the first device 102 from the second device 106 on fixed intervals, such as one minute intervals during the training period. For an illustrative example, the navigation system 100 supports the second device 106 conveying the artificial intelligence model update 121 to the first device 102 and to other vehicles near or planning to enter the region reported by the first device 102 to include the obstruction 202.

Continuing with the example, the navigation system 100 can use the map-related location 109 generated or provided from the first device 102 without the user input 114. The navigation system 100 can utilize the map-related location 109 to provide information, assist maneuvering, control maneuvers, or a combination thereof for the first device 102.

Continuing with the example, the navigation system 100 can communicate the artificial intelligence model update 121 from the second device 106 to other devices or vehicles, or directly communicate to the other devices or vehicles, such as for a peer-to-peer communication system. The navigation system 100 can communicate the artificial intelligence model update 121 for informing other devices or vehicles of the location or status of the first device 102 itself, about other vehicles detected and identified around the first device 102, or a combination thereof.

As a more specific example, the navigation system 100 can use the map-related location 109 to generate the vehicle movement control 228, such as for steering, braking, setting or adjusting travel speed, accessary control, or a combination thereof.

Figure 3:
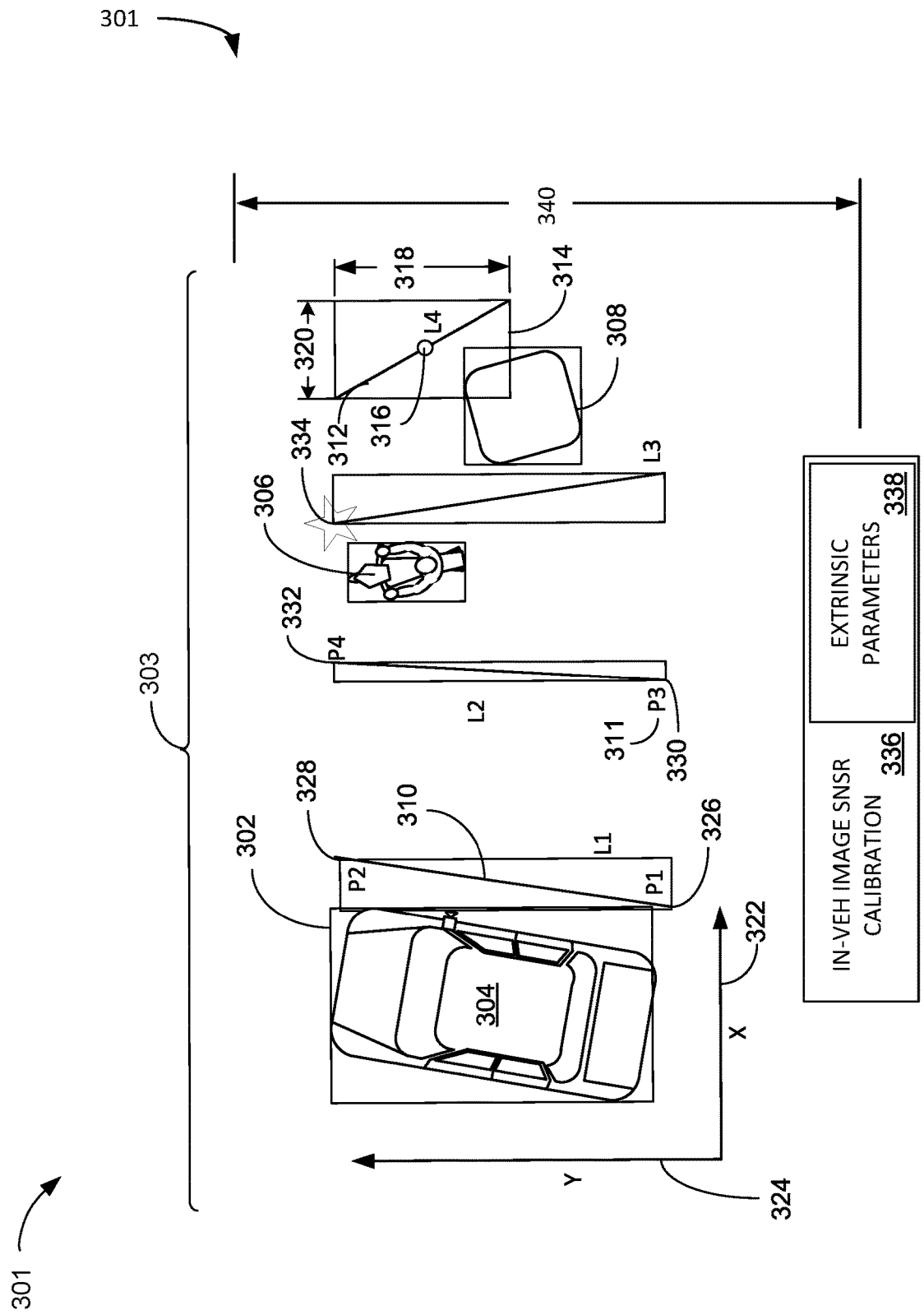
FIG. 3 is an exemplary object detection diagram of a surrounding scene as processed by the navigation system.

Referring now to FIG. 3, therein is shown an exemplary object detection diagram of a surrounding image 301 as processed by the navigation system 100. The example of the surrounding image 301 depicts a bounding box 302 surrounding each of the objects in a scan area 303, including a parked vehicle 304, a motorcycle 306, a placard 308, image lines 310 designated L1, L2, and L3, and a right-side curb 312 designated as L4.

The right-side curb bounding box 314 can be defined by a box center 316, a box length 318, and a box width 320. Each of the objects detected in the scan area 303 can be surrounded by the bounding box 302. It is understood that the scan area 303 is assumed to be level and having a constant value in the vertical (Z) plane. The box center 316 in defined by an X coordinate 322 and a Y coordinate 324. The box length 318 is defined as the measure of the bounding box 302 as measured through the Y coordinate 324 with the X coordinate 322 held at a constant value. The box width 320 is defines as the measure of the bounding box 302 as measured through the X coordinate 322 with the Y coordinate 324 held at a constant value.

The objects detected in the scan area 303 can be reduced to leave specific lines by removing the detected objects, including the parked vehicle 304 and the motorcycle 306. The placard 308 can indicate the availability of a right turn lane or a bicycle lane.

The image lines 310 designated as L1 and L2 can be defined by their image coordinates 311 designated as P1, P2, P3, and P4. The image coordinate P1 326 and the image coordinate P2 328 can define the image line 310 designated as L1. The image coordinate P3 330 and the image coordinate P4 332 can define the image line 310 designated as L2. It is understood that the image coordinate P1 326, the image coordinate P2 328, the image coordinate P3 330, and the image coordinate P4 332, are each defined by the X coordinate 322 and the Y coordinate 324 for each of the image coordinates 311.

The image line 310 designated as L1 can be transformed by a geometric conversion of the image coordinate P1 326 and the image coordinate P2 328 in real world coordinates based on the position of the in-vehicle image sensor 110 as provided by the first device 102 and an in-vehicle image sensor calibration 336 of the in-vehicle image sensor 110. The in-vehicle image sensor calibration 336 can provide extrinsic parameters 338 of the in-vehicle image sensor 110 and can include lens distortion, lens rotation, distance translation due to lens curvature, and a predefined distance 340 that is within the capabilities of the in-vehicle image sensor 110.

The image line 310 designated as L2 can be transformed by a geometric conversion of the image coordinate P3 330 and the image coordinate P4 332 in world coordinates 334 based on the position of the in-vehicle image sensor 110 as provided by the first device 102 and the extrinsic parameters 338 of the in-vehicle image sensor 110.

It has been discovered that the determination of the bounding box 302 and the image coordinates 311 can provide sufficient information to calculate the image coordinates 311 in the world coordinates 334 by using a geometric conversion. The accurate depiction of the relative position of the image lines 310 relative to the first device 102 simplifies the generation of the vehicle movement control 228 of FIG. 2 required to move the first device 102 along a planned route.

Figure 4:
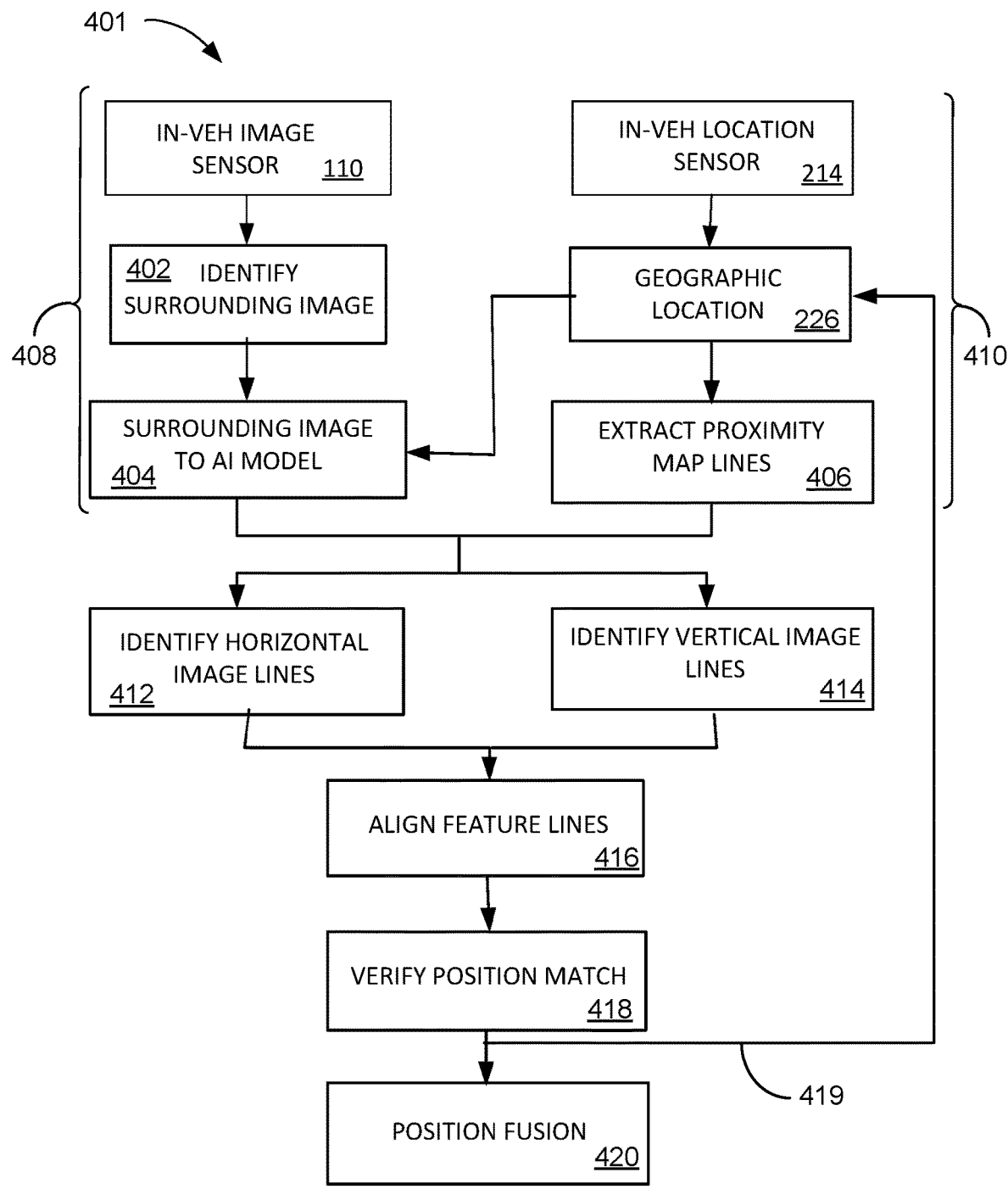
FIG. 4 is an exemplary functional block diagram of the independent positioning mechanism of the navigation system.

Referring now to FIG. 4, therein is shown an exemplary functional block diagram 401 of the independent positioning mechanism 115 of FIG. 1 of the navigation system 100 of FIG. 1. The exemplary functional block diagram 401 of the independent positioning mechanism 115 depicts the in-vehicle image sensor 110 coupled to an identify surrounding image module 402. In the identify surrounding image module 402, the in-vehicle image sensor 110 can capture the scan area 303 of FIG. 3 as a photo image. The scan area 303 can contain the image lines 310 of FIG. 3 including lane lines, crosswalks, vehicles, and specialized lanes.

The identify surrounding image module 402 can pass the scan data stream 111 of FIG. 1 from the in-vehicle image sensors 110 to a surrounding image to AI model module 404. The surrounding image to AI model module 404 can process the scan data stream 111 by submitting it to the artificial intelligence model 116 of FIG. 1 to identify the image lines 310 captured from the scan area 303. The artificial intelligence model 116 can ignore the vehicles and any obstructions that are shown in the scan area 303, and extract only the lane lines and crosswalks in the form of the image lines 310.

In parallel the in-vehicle location sensor 214 can monitor the global positioning location 130 of FIG. 1 provides by the satellites 132 of FIG. 1. When the obstruction 202 of FIG. 2 prevents the satellites 132 from updating the global positioning location 130, the in-vehicle location sensor 214 can estimate the change in position by monitoring the movement of the vehicle 201 of FIG. 2.

The in-vehicle location sensor 214 can be coupled to a geographic location 226. The geographic location 226 can provide a predicted position in the form of the geographic location 226 of FIG. 2. As the vehicle 201 proceeds along its route, the in-vehicle location sensor 214 monitors the progress. Over time, the accuracy of the geographic location can degrade, so the value must be updated periodically. The geographic location can be passed to the surrounding image to AI model module 404 to assist in the processing of the image lines 310 by the artificial intelligence model 116.

The geographic location 226 is coupled to an extract proximity map lines module 406 for processing. The extract proximity map lines module 406 can select a smaller portion of a proximity map, stored in the HD map local storage 108 of FIG. 1 that provides a high definition map of the area around the geographic location 226. Map lines can be extracted from the proximity map that correspond to the area around the geographic location 226. Since the in-vehicle location sensor 214 at best provides an accurate estimate of the geographic location 226, the size of the smaller portion of the proximity map can get larger over time. The extract proximity map lines module 406 can select the map lines present in the proximity map in order to verify the image lines 310 from an optical path 408 against the map lines from a mechanical path 410.

The optical path 408 can utilize the scan data stream 111 as an information source to generate the location of the vehicle 201 based on the image lines 310 extracted by the artificial intelligence model 116. In contrast, the mechanical path 410 relies on the in-vehicle location sensor 214 and the geographic location 226 to monitor changes to the location of the vehicle 201. The convergence of the optical path 408 and the mechanical path 410 is discussed below.

From the surrounding image to AI model module 404 and the extract proximity map lines module 406, both sets of the image lines 310 and the map lines are submitted to an identify horizontal image lines 412 and an identify vertical image lines 414. The identify horizontal image lines 412 can identify the matching lines from the image lines 310 and the map lines that are in the horizontal direction. The identify vertical image lines 414 can identify the matching lines from the image lines 310 and the map lines that are in the vertical direction.

The match sets from the identify horizontal image lines 412 and the identify vertical image lines 414 are submitted to an align feature lines module 416 that can align the image lines 310 and the map lines from the HD map local storage 108. The align feature lines module 416 can pass the matched sets to a verify position match module 418. The verify position match module 418 can assign the physical coordinates from the map lines from the HD map local storage 108, which provide a known position with the image lines in order to provide an update position 419 to the geographic location 226 in order to refine the accuracy of the geographic location 226.

The verify position match module 418 can also provide the update position 419 to a position fusion module 420. The map-related location 109 can get accurate and stable location, a position fusion module 420 is used to fuse the map-related location 109 and the update position 419, such as the IMU-estimated location, to provide sufficient accuracy to provide the vehicle 201 with maneuvering instructions to increase speed, decrease speed, change lanes, change position within a lane, or access a parking space. The position fusion module 420 can provide the map-related location 109 of FIG. 1 for display to the user 112 of FIG. 1.

It has been discovered that the independent positioning mechanism 115 of the navigation system 100 can provide accurate and timely updates for geographic location 226 of the vehicle 201. By comparing the results of the optical path 408 with the results of the mechanical path 410, a feedback signal in the form of the update position 419 can reduce the error generated in the mechanical path 410 and maintain the accuracy of the geographic location 226. The update position signal 419 can verify the accuracy of the artificial intelligence model update 121 of FIG. 1 during the training session. The second device 106 can forward the artificial intelligence model update 121 to the other vehicles that are communicating with the navigation system 100. This communication can provide a safer and more efficient travel path through the obstruction 202 of FIG. 2 accessed by the vehicle 201.

Figure 5:
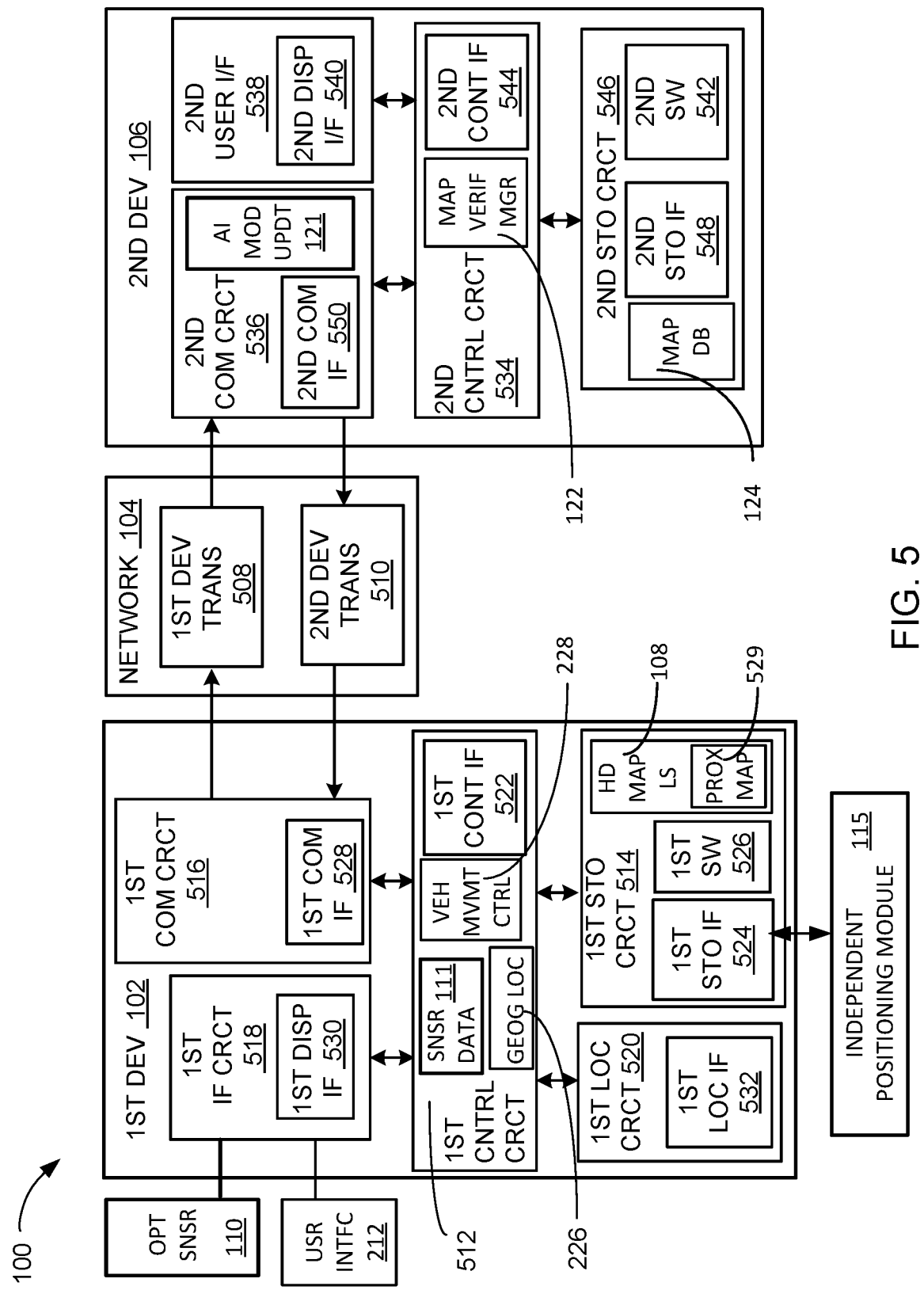
FIG. 5 is an exemplary block diagram of the navigation system in an embodiment.

Referring now to FIG. 5, therein is shown an exemplary block diagram of the navigation system 100 in an embodiment. The navigation system 100 can include the first device 102, the network 104, and the second device 106. The first device 102 can send information in a first device transmission 508 over the network 104 to the second device 106. The second device 106 can send information in a second device transmission 510 over the network 104 to the first device 102 or the vehicle 201 of FIG. 2.

For illustrative purposes, the navigation system 100 is shown with the first device 102 as a client device, although it is understood that the navigation system 100 can include the first device 102 as a different type of device. For example, the first device 102 can be the vehicle 201 containing the first display interface 530 coupled to the user interface 212.

Also, for illustrative purposes, the navigation system 100 is shown with the second device 106 as a server, although it is understood that the navigation system 100 can include the second device 106 as a different type of device. For example, the second device 106 can be a client device. By way of an example, the navigation system 100 can be implemented entirely on the first device 102. The second device 106 can provide training and enhancement of the artificial intelligence model 116 of FIG. 1 in the form of the artificial intelligence model update 121 of FIG. 1.

Also, for illustrative purposes, the navigation system 100 is shown with interaction between the first device 102 and the second device 106. However, it is understood that the first device 102 can be a part of or the entirety of an autonomous vehicle, a smart vehicle, or a combination thereof. Similarly, the second device 106 can similarly interact with the first device 102 representing the autonomous vehicle, the intelligent vehicle, or a combination thereof.

For brevity of description in this embodiment of the present invention, the first device 102 will be described as a client device, the vehicle 201, and the second device 106 will be described as a server device. The embodiment of the present invention is not limited to this selection for the type of devices. The selection is an example of an embodiment of the present invention.

The first device 102 can include a first control circuit 512, a first storage circuit 514, a first communication circuit 516, a first interface circuit 518, and a first location circuit 520. The first control circuit 512 can include a first control interface 522. The first control circuit 512 can execute a first software 526 to provide the intelligence of the navigation system 100.

The first control circuit 512 can be implemented in a number of different manners. For example, the first control circuit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control circuit 512 and other functional units or circuits in the first device 102. The first control interface 522 can also be used for communication that is external to the first device 102.

The first control interface 522 can receive information from the other functional units/circuits or from external sources, or can transmit information to the other functional units/circuits or to external destinations. The external sources and the external destinations refer to sources and destinations external to the first device 102.

The first control interface 522 can be implemented in different ways and can include different implementations depending on which functional units/circuits or external units/circuits are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The first storage circuit 514 can store the first software 526 and the HD map local storage 108. The first storage circuit 514 can also store the relevant information, such as data representing incoming images, data representing previously presented image, sound files, or a combination thereof. The HD map local storage 108 can be a high-definition map containing detailed map segments including the world coordinates 334 of FIG. 3 for the region of travel. The HD map local storage 108 can include a proximity map 529 representing a smaller segment of the HD map local storage 108 that is centered around the geographic location 226. The proximity map 529 can be a portion of the HD map local storage 108 containing all of the known lane details including the world coordinates 334 around the geographic location 226.

The first storage circuit 514 can be a volatile memory, a nonvolatile memory, an internal memory, an external memory, or a combination thereof. For example, the first storage circuit 514 can be a nonvolatile storage such as non-volatile random-access memory (NVRAM), Flash memory, disk storage, or a volatile storage such as static random-access memory (SRAM).

The first storage circuit 514 can include a first storage interface 524. The first storage interface 524 can be used for communication between the first storage circuit 514 and other functional units or circuits in the first device 102, such as the HD map data local storage 108 of FIG. 1. The first storage interface 524 can also be used for communication that is external to the first device 102.

The first storage interface 524 can receive information from the other functional units/circuits or from external sources, or can transmit information to the other functional units/circuits or to external destinations. The external sources and the external destinations refer to sources and destinations external to the first device 102. The first storage interface 524 can receive input from and source data to the independent positioning module 115. The independent positioning module 115 can send the geographic location 226 to the first control circuit 512 through the first storage interface 524.

The first storage interface 524 can include different implementations depending on which functional units/circuits or external units/circuits are being interfaced with the first storage circuit 514. The first storage interface 524 can be implemented with technologies and techniques similar to the implementation of the first control interface 522.

The first communication circuit 516 can enable external communication to and from the first device 102. For example, the first communication circuit 516 can permit the first device 102 to communicate with the second device 106 and the network 104.

The first communication circuit 516 can also function as a communication hub allowing the first device 102 to function as part of the network 104 and not limited to be an endpoint or terminal circuit to the network 104. The first communication circuit 516 can include active and passive components, such as microelectronics or an antenna, for interaction with the network 104.

The first communication circuit 516 can include a first communication interface 528. The first communication interface 528 can be used for communication between the first communication circuit 516 and other functional units or circuits in the first device 102. The first communication interface 528 can receive information from the second device 106 for distribution to the other functional units/circuits or can transmit information to the other functional units or circuits.

The first communication interface 528 can include different implementations depending on which functional units or circuits are being interfaced with the first communication circuit 516. The first communication interface 528 can be implemented with technologies and techniques similar to the implementation of the first control interface 522.

The first interface circuit 518 allows the user 112 of FIG. 1 to interface and interact with the first device 102. The first interface circuit 518 can include an input device and an output device. Examples of the input device of the first interface circuit 518 can include a keypad, a touchpad, soft-keys, a keyboard, a microphone, an infrared sensor for receiving remote signals, the in-vehicle image sensor 110, or any combination thereof to provide data and communication inputs. By way of an example, the in-vehicle image sensor 110 can connect to the first interface circuit 518 through a wired or wireless connection to deliver the sensor data stream 111 to the first control circuit 512. The first interface circuit 518 can pass the input from the in-vehicle image sensor 110 to the first control circuit 512 for processing and storage. During training of the independent positioning module 115, the first communication interface 528 can transfer the input from the in-vehicle image sensors 110, the location of the in-vehicle image sensors 110, and the extrinsic parameters of the in-vehicle image sensor 110 to the second device 106 to enhance the accuracy and reliability of the artificial intelligence model 116 of FIG. 1, the lane identifier module 118 of FIG. 1, and the location identifier module 120 of FIG. 1.

The first interface circuit 518 can include a first display interface 530. The first display interface 530 can include an output device. The first display interface 530 can couple the user interface 212 including a projector, a video screen, a touch screen, a speaker, a microphone, a keyboard, and combinations thereof. The user interface 212 can display the map-related location 109 to the user 112 of FIG. 1.

The first control circuit 512 can operate the first interface circuit 518 to display information generated by the navigation system 100 and receive input from the user 112. The first control circuit 512 can also execute the first software 526 for the other functions of the navigation system 100, including receiving location information from the first location circuit 520. In the event that the obstruction 202 of FIG. 2 blocks the function of the location circuit 520, the first control circuit can retrieve the geographic location 226 from the independent positioning module 115. The first control circuit 512 can further execute the first software 526 for interaction with the network 104 via the first communication circuit 516. The first control unit 512 can operate the independent positioning mechanism 115 of FIG. 1.

The first control circuit 512 can operate the first interface circuit 518 to collect data from the in-vehicle image sensors 110. The first control circuit 512 can also receive location information from the first location circuit 520. The first control circuit 512 can operate the independent positioning module 115 in order to deliver the map-related location 109 for display on the user interface 212 and generate the control guidance instructions and vehicle movement controls 228 of FIG. 2 to autonomously drive or assist in driving the first device 102. The vehicle movement controls 228 can include increase speed, decrease speed, lane change suggestions, lane boundary warnings, and traffic avoidance alerts. The vehicle movement controls 228 can be generated based on the feedback from the environmental sensors 210 of FIG. 2 and the map-related location 109.

The first location circuit 520 can generate location information based on interaction with the satellites 132 of FIG. 1. The first location circuit 520 can be implemented in many ways. For example, the first location circuit 520 can function as at least a part of the global positioning system, an inertial navigation system, a cellular-tower location system, a gyroscope, or any combination thereof. Also, for example, the first location circuit 520 can utilize components such as an accelerometer, gyroscope, or global positioning system (GPS) receiver.

The first location circuit 520 can include a first location interface 532. The first location interface 532 can be used for communication between the first location circuit 520 and other functional units or circuits in the first device 102, including the environmental sensors 210.

The first location interface 532 can receive information from the other functional units/circuits or from external sources, or can transmit information to the other functional units/circuits or to external destinations. The external sources and the external destinations refer to sources and destinations external to the first device 102. The first location interface 532 can receive the global positioning location 130 of FIG. 1 from the global positioning system 132 of FIG. 1.

The first location interface 532 can include different implementations depending on which functional units/circuits or external units/circuits are being interfaced with the first location circuit 520. The first location interface 532 can be implemented with technologies and techniques similar to the implementation of the first control circuit 512.

The second device 106 can be optimized for implementing an embodiment of the present invention in a multiple device embodiment with the first device 102. The second device 106 can provide the additional or higher performance processing power compared to the first device 102. The second device 106 can include a second control circuit 534, a second communication circuit 536, a second user interface 538, and a second storage circuit 546.

The second user interface 538 allows an operator (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

During the training process, the second control circuit 534 can transmit the artificial intelligence model update 121 through the second communication circuit 536. The second control circuit 536 can verify the content of the artificial intelligence model update 121 does indeed represent geographic location 226 calculated for sensor data stream 111 sent from the first device. Once the artificial intelligence model update 121 has been verified with the background map database 124, the second control circuit 534 can transfer the artificial intelligence model update 121 through the second storage circuit 546 to the map verification manager 122 for processing and further distribution.

The second control circuit 534 can execute a second software 542 to provide the intelligence of the second device 106 of the navigation system 100. The second software 542 can operate in conjunction with the first software 526. The second control circuit 534 can provide additional performance compared to the first control circuit 512.

The second control circuit 534 can operate the second user interface 538 to display information. The second control circuit 534 can also execute the second software 542 for the other functions of the navigation system 100, including operating the second communication circuit 536 to communicate with the first device 102 over the network 104.

The second control circuit 534 can be implemented in a number of different manners. For example, the second control circuit 534 can be a processor, an embedded processor, a microprocessor, hardware control logic, a hardware finite state machine (FSM), a digital signal processor (DSP), or a combination thereof.

The second control circuit 534 can include a second control interface 544. The second control interface 544 can be used for communication between the second control circuit 534 and other functional units or circuits in the second device 106. The second control interface 544 can also be used for communication that is external to the second device 106.

The second control interface 544 can receive information from the other functional units/circuits or from external sources, or can transmit information to the other functional units/circuits or to external destinations. The external sources and the external destinations refer to sources and destinations external to the second device 106.

The second control interface 544 can be implemented in different ways and can include different implementations depending on which functional units/circuits or external units/circuits are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

The second storage circuit 546 can store the second software 542. The second storage circuit 546 can also store the information such as data representing incoming images, data representing previously presented image, sound files, or a combination thereof. The second storage circuit 546 can be sized to provide the additional storage capacity to supplement the first storage circuit 514. During the training process the second storage circuit 546 can receive the sensor data stream 111 and the geographic location 226 used to generate artificial intelligence model update 121 for the first device 102. The second storage circuit 546 can pass the artificial intelligence model update 121, in real-time, to the first device 102. The artificial intelligence model update 121 can then be passed through the second communication circuit 536 for transmission to the vehicle 201.

For illustrative purposes, the second storage circuit 546 is shown as a single element, although it is understood that the second storage circuit 546 can be a distribution of storage elements. Also, for illustrative purposes, the navigation system 100 is shown with the second storage circuit 546 as a single hierarchy storage system, although it is understood that the navigation system 100 can include the second storage circuit 546 in a different configuration. For example, the second storage circuit 546 can be formed with different storage technologies forming a memory hierarchal system including different levels of caching, main memory, rotating media, or off-line storage.

The second storage circuit 546 can be a controller of a volatile memory, a nonvolatile memory, an internal memory, an external memory, or a combination thereof. For example, the second storage circuit 546 can be a controller of a nonvolatile storage such as non-volatile random-access memory (NVRAM), Flash memory, disk storage, or a volatile storage such as static random access memory (SRAM).

The second storage interface 548 can receive information from the other functional units/circuits or from external sources, or can transmit information to the other functional units/circuits or to external destinations. The external sources and the external destinations refer to sources and destinations external to the second device 106.

The second storage interface 548 can include different implementations depending on which functional units/circuits or external units/circuits are being interfaced with the second storage circuit 546. The second storage interface 548 can be implemented with technologies and techniques similar to the implementation of the second control interface 544.

The second communication circuit 536 can enable external communication to and from the second device 106. For example, the second communication circuit 536 can permit the second device 106 to communicate with the first device 102 over the network 104. By way of an example, the second device 106 can provide the artificial intelligence model update 121 to the first device 102.

The second communication circuit 536 can also function as a communication hub allowing the second device 106 to function as part of the network 104 and not limited to be an endpoint or terminal unit or circuit to the network 104. The second communication circuit 536 can include active and passive components, such as microelectronics or an antenna, for interaction with the network 104.

The second communication circuit 536 can include a second communication interface 550. The second communication interface 550 can be used for communication between the second communication circuit 536 and other functional units or circuits in the second device 106. The second communication interface 550 can receive information from the other functional units/circuits or can transmit information to the other functional units or circuits.

The second communication interface 550 can include different implementations depending on which functional units or circuits are being interfaced with the second communication circuit 536. The second communication interface 550 can be implemented with technologies and techniques similar to the implementation of the second control interface 544.

During the training process the first communication circuit 516 can couple with the network 104 to send a request for the artificial intelligence model update 121 to the second device 106 in the first device transmission 508. The second device 106 can receive information in the second communication circuit 536 from the first device transmission 508 of the network 104.

The second communication circuit 536 can couple with the network 104 to send information to the first device 102, including the artificial intelligence model update 121 and the updates for the independent positioning module 115 in the second device transmission 510. The first device 102 can receive information in the first communication circuit 516 from the second device transmission 510 of the network 104. The navigation system 100 can be executed by the first control circuit 512, the second control circuit 534, or a combination thereof. For illustrative purposes, the second device 106 is shown with the partition containing the second user interface 538, the second storage circuit 546, the second control circuit 534, and the second communication circuit 536, although it is understood that the second device 106 can include a different partition. For example, the second software 542 can be partitioned differently such that some or all of its function can be in the second control circuit 534 and the second communication circuit 536. Also, the second device 106 can include other functional units or circuits not shown in FIG. 5 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

It has been discovered that the second device 106 can provide the artificial intelligence model update 121 to the first device 102 that provides updates for the independent positioning module 115. As an example, the second control circuit 534 can verify the artificial intelligence model update 121 by using the scan data stream 111 and the geographical location 226 to generate the map-related location 109 to compare with the geographical location 226 provided by the in-vehicle location sensor 214. When the artificial intelligence model update 121 has been verified, the second device 106 and transfer the artificial intelligence model update 121 to the first device 102 through the network 104. By incorporating the artificial intelligence model update 121, the first device 102 can complete the training process of the artificial intelligence model 116 and is prepared to deal with the loss of the global positioning location 130 due to the obstruction 202.

Figure 6:
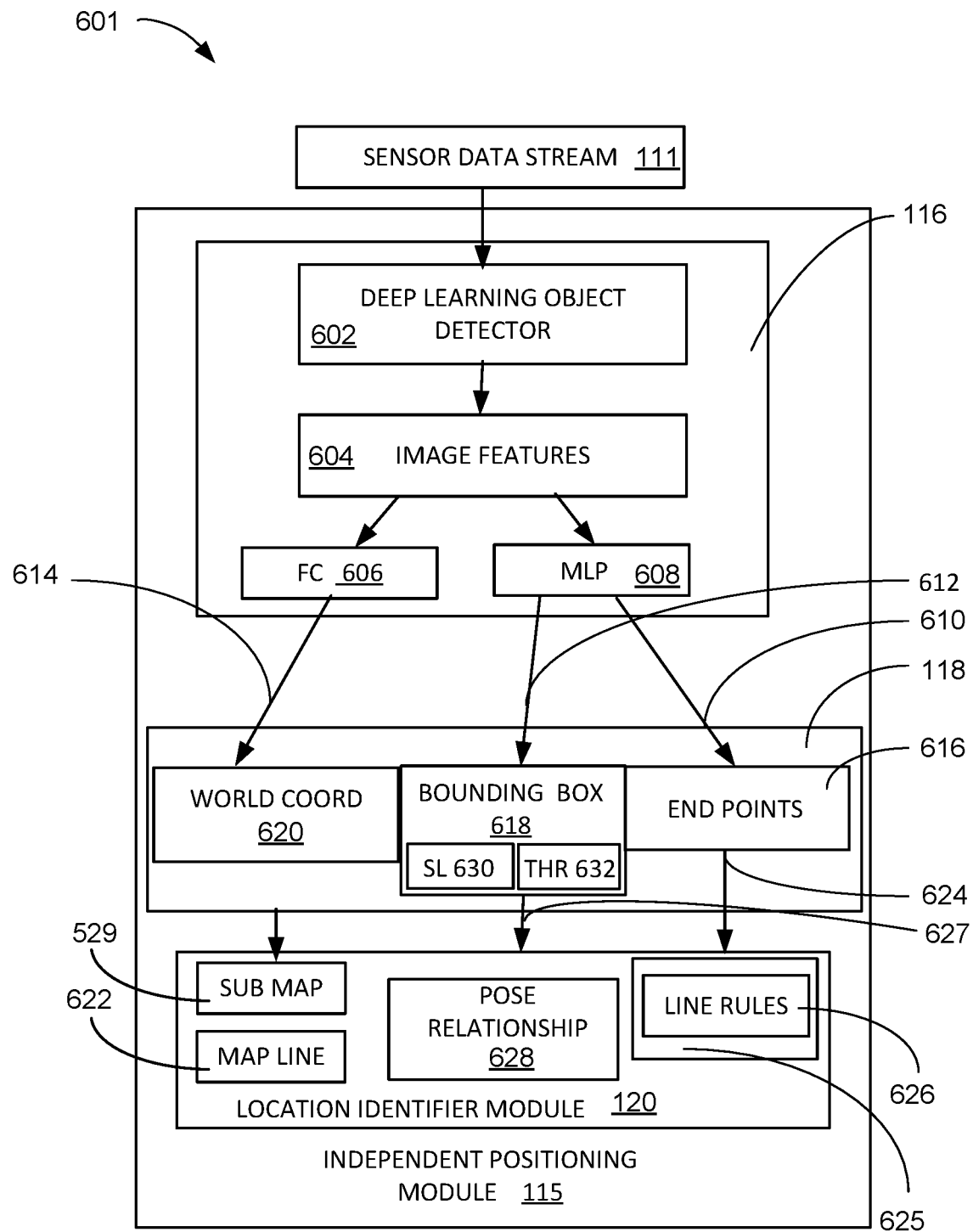
FIG. 6 is an exemplary block diagram of the independent positioning module of FIG. 1.

Referring now to FIG. 6, therein is shown an exemplary block diagram 601 of the independent positioning module 115. The exemplary block diagram 601 of the independent positioning module 115 can include the artificial intelligence model 116, the lane identifier module 118, and the location identifier module 120. It is understood that the independent positioning module 115 and its sub-components can be software executed by the second control circuit 534, the first control circuit 512, or a combination thereof. It is further understood that the independent positioning module 115 and its sub-components can have specific hardware assist logic where necessary to speed-up the object identification process.

The artificial intelligence model 116 can include a deep learning object detector 602, such as Mask Regional-based Convolutional Neural Network (R-CNN), Fast Segmentation Convolutional Neural Network (Fast-SCNN), U-Net, FAST Regional-based Convolutional Neural Network (Fast R-CNN), You Only Look Once (YOLO), Single Shot Detector (SSD), or the like. The deep learning object detector 602 can receive the photo from the sensor data stream 111 of FIG. 1 and process the data from the scan area 204 of FIG. 2 based on deep learning semantic segmentation and image morphology processing. The deep learning object detector 602 can be coupled to an image features module 604.

The image features module 604 can process the output of the deep learning object detector 602 to identify the objects detected from the initial processing. By focusing on the high probability objects a more robust determination can be made. The image features module 604 can further process the objects detected with high probability. This process can provide the highest chance of identifying all of the objects in the scan area 303 of FIG. 3.

The output of the image features module 604 can be further processed by a fully connected module (FC) 606, which can define the labeling or classification of objects in the scan area 303. By way of an example, the fully connected module 606 can identify the parked vehicle 304 of FIG. 3, the motorcycle 306 of FIG. 3, the placard 308 of FIG. 3, the image lines 310 of FIG. 3 designated as L1, L2, L3, and L4, and the right-side curb 312 of FIG. 3. The labeling of the identified objects can simplify the later processing.

The output of the image features module 604 can also be processed by a multilayer perception module (MLP) 608. The multilayer perception module (MLP) 608 can be trained by the artificial intelligence update 121 of FIG. 1 provided by the second control circuit 534 of FIG. 5 to more effectively recognize the image lines 310 designated as L1, L2, L3, and L4, and the right-side curb 312. The training process performed by the artificial intelligence update 121 can involve adjusting the weighting functions in the multilayer perception module (MLP) 608. The multilayer perception module (MLP) 608 can be defined as a neural network tasked with identifying the endpoints and lines in the scan area 303. The output of the multilayer perception module (MLP) 608 can be the bounding box 302 surrounding each of the image line 310, and the right-side curb 312. The multilayer perception module (MLP) 608 can also output endpoints 610 for each of the image lines 310 identified during analysis.

The lane identifier module 118 can receive the endpoints 610, boxes 612, and classification 614 for each of the lines detected in the scan area 303. The endpoints 610 that are paired with their bounding box 612 can be manipulated by the endpoints module 616 in order to convert the endpoints 610 by a world coordinates module 620. The world coordinates module 620 can be utilize the geographic location 226 of FIG. 2 transferred from the first device 102 and the extrinsic parameters 338 provided by the in-vehicle sensor calibration 336 of the in-vehicle image sensor 110 to determine world endpoints 624. The world endpoints 624 can be defined as the estimated location, based on the in-vehicle location sensor 214 of FIG. 2, for each of the endpoints 610.

The classification 614 can mark objects identified in the scan area 303. The objects can include the parked vehicle 304, the motorcycle 306, and the placard 308 and would not be processed by the world coordinates module 620. The objects can be removed to simplify analysis done by the endpoints module 616 and a bounding box module 618.

The bounding box module 618 can receive the bounding box 612 in step sequence with the endpoints module 616 receiving the endpoints 610. The bounding box module 618 can determine an image slope 630 of the image line 310 being processed. The endpoints 610 can indicate the inclination and the image slope 630 of the image line 310 being analyzed. The bounding box module 618 can output world boxes 627 in separately categorized in order to sort the image lines 310 as the horizontal lines 412 of FIG. 4 or the vertical lines 414 of FIG. 4.

The bounding box module 618 can separate the image lines 310 as the horizontal lines 412 or the vertical lines 414. A threshold 632 can be applied to assist with the separation of the horizontal lines 412 and the vertical lines 414. If the image slope 630 of the image line 310 is above the threshold 632, the image line 310 is determined to be the vertical line 414. If the image slope 630 of the image line 310 is less than or equal to the threshold 632, the image line 310 is determined to be the horizontal line 412.

The location identifier module 120 can receive the world endpoints 624, and the world boxes 627 defining the image lines 310 as the horizontal lines 412 and the vertical lines 414. A proximity map 529 can provide a portion of the HD map local storage 108 of FIG. 5 that corresponds to the scan area 303 and extends the pre-determined distance 340 from the geographic location 226, where the in-vehicle image sensor is located. The pre-determined distance 340 is the distance defined by the extrinsic parameters 338 of the in-vehicle image sensors 110 to be within the clarity specifications of the in-vehicle image sensors 110.

The location identifier module 120 can provide a rules memory 625 for storing a set of reloadable line rules 626 for identifying a pose relationship 628 for aligning a map line 622, which is selected from the proximity map 529 to be within the pre-defined distance 340 from the geographic location 226, with the image line 310 defined by the world endpoints 624, and the world boxes 627. It is understood that the geographic location 226 can include an error component due to its mechanical nature.

By way of an example the line rules for determining pose relationship 628 of the map line 622 and the image line 310 can include:
1) the world endpoints 624 of the image line 310 should be offset from the map line 622 by substantially the same distance.
2) the length of image line 310 should identically match the length of the map line 622.
3) the image slope 630 of the image line 310 should be equal to the image slope 630 of the map line 622.
4) converging image line 310 and the map line 622 should exactly match to form the pose relationship 628.

It is understood that the world endpoints 624 can provide the overlay depiction of the image line 310 and the map line 622 through a geometric projection of the image line 310. The independent positioning module 115 can update the geographic location 226 based on the actual position read from the map line 622 in the proximity map 529. The update of the geographic location 226 can allow sustained operation of the vehicle 201 of FIG. 2, without relying on the global positioning location 130.

It has been discovered that the detection of the world endpoints 624 can allow the alignment of the image lines 310 with the map line 622 having substantially the same geographical location 226. The map line 622 can provide a verified version of the geographical location 226, while the image line 310 has an estimate of the geographical location 226 provided by the in-vehicle location sensor 214. By establishing the pose relationship between the image line 310 and the map line 622, the geographical location can be updated to the verified version of the geographical location 226 provided by the map line 622. The update of the geographical location 226 can extend the ability of the first control circuit 512 of FIG. 5 to generate the vehicle movement control 228 of FIG. 2 for long durations.

Figure 7:
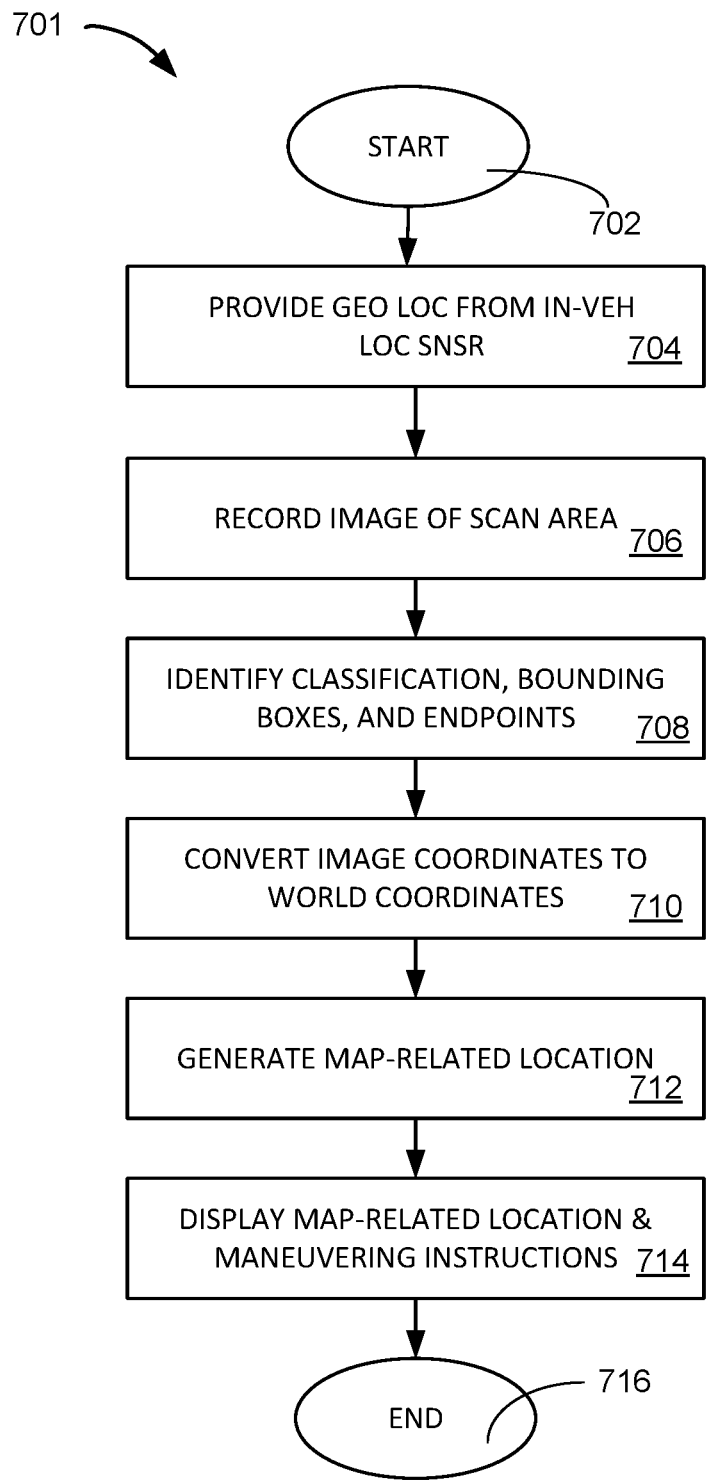
FIG. 7 is an exemplary control flow chart of the independent positioning mechanism of the navigation system.

Referring now to FIG. 7, therein is shown an exemplary operational flow chart 701 of the independent positioning mechanism 115 of the navigation system 100. The exemplary operational flow chart 701 of the navigation system 100 depicts a start block 702 indicating that the first device 102 of FIG. 1 has lost the global positioning location 130 of FIG. 1 due to the obstruction 202 of FIG. 2. The flow proceeds to provide a geographical location from in-vehicle location sensor 704. The in-vehicle location sensor 214 of FIG. 2 can provide the geographical location 226 of FIG. 2 as an estimate based on the last known value of the global positioning location 130. The in-vehicle location sensor 214 can use mechanical means, such as a gyroscope, accelerometers, force meters, and tilt meters to monitor the movement of the first device 102 relative to the last known value of the global positioning location 130.

The flow proceeds to a record image of scan area block 706 in which the in-vehicle image sensor 110 of FIG. 1 of the first device 102 records the scan area 303. The in-vehicle image sensor calibration 336 can generate the extrinsic parameters 338 for the in-vehicle image sensor 110. The extrinsic parameters 338 can be used by geometric conversion to locate the world coordinates 334 of image lines 310 in the scan area 303.

The flow proceeds to a identify classification, bounding boxes, and endpoints block 708, in which the sensor data stream 111 of the in-vehicle image sensors 110 is analyzed by the deep learning object detector 602 of FIG. 6 of the artificial intelligence model 116 of FIG. 1. The output of the artificial intelligence model 116 can be the endpoints 610 of FIG. 6, the boxes 612 of FIG. 6, and the classification 614 of FIG. 6 for each of the image lines 310 detected in the scan area 303.

The flow proceeds to a convert image coordinates to world coordinates block 710. Here, line identification module 118 of FIG. 1 can receive the endpoints 610, the boxes 612, and the classification 614. The world coordinate module 620 of FIG. 6 can convert the endpoints 610 to world endpoints 624 of FIG. 6 through a geometric conversion based on the extrinsic parameters 338 of FIG. 3. The classification 614 can identify items in the scan area 303 that can be deleted from the analysis. This leaves the image lines 310 for further analysis. The bounding box module 618 can separate the horizontal lines 412 of FIG. 4 from the vertical lines 414 of FIG. 4. Each set of the horizontal lines 412 and the vertical lines 414 can be paired with the world endpoints 624.

The flow then proceeds to a generate map-related location block 712. The location identifier module 120 of FIG. 1 can pair the map line 622 of FIG. 6, with a known value of the geographic location 226, with the image line 310 having the estimated value to the geographic location 226. By establishing a pose relationship 628 between the map line 622 and the image line 310, the geographic location 226 can be updated to the known and verified value from the map line 622.

The flow proceeds to a display map-related location and maneuvering instructions block 714. The location identifier module 120 can establish the verified version of the geographical location 226. This allows the first control circuit 512 to generate the next set of the vehicle movement controls 228 for controlling the first device 102 as it progresses through the scan area 303. The first control circuit 512 can send the map-related location 109 through the user interface 212 of FIG. 2 for displaying to the user 112 of FIG. 1.

Figure 8:
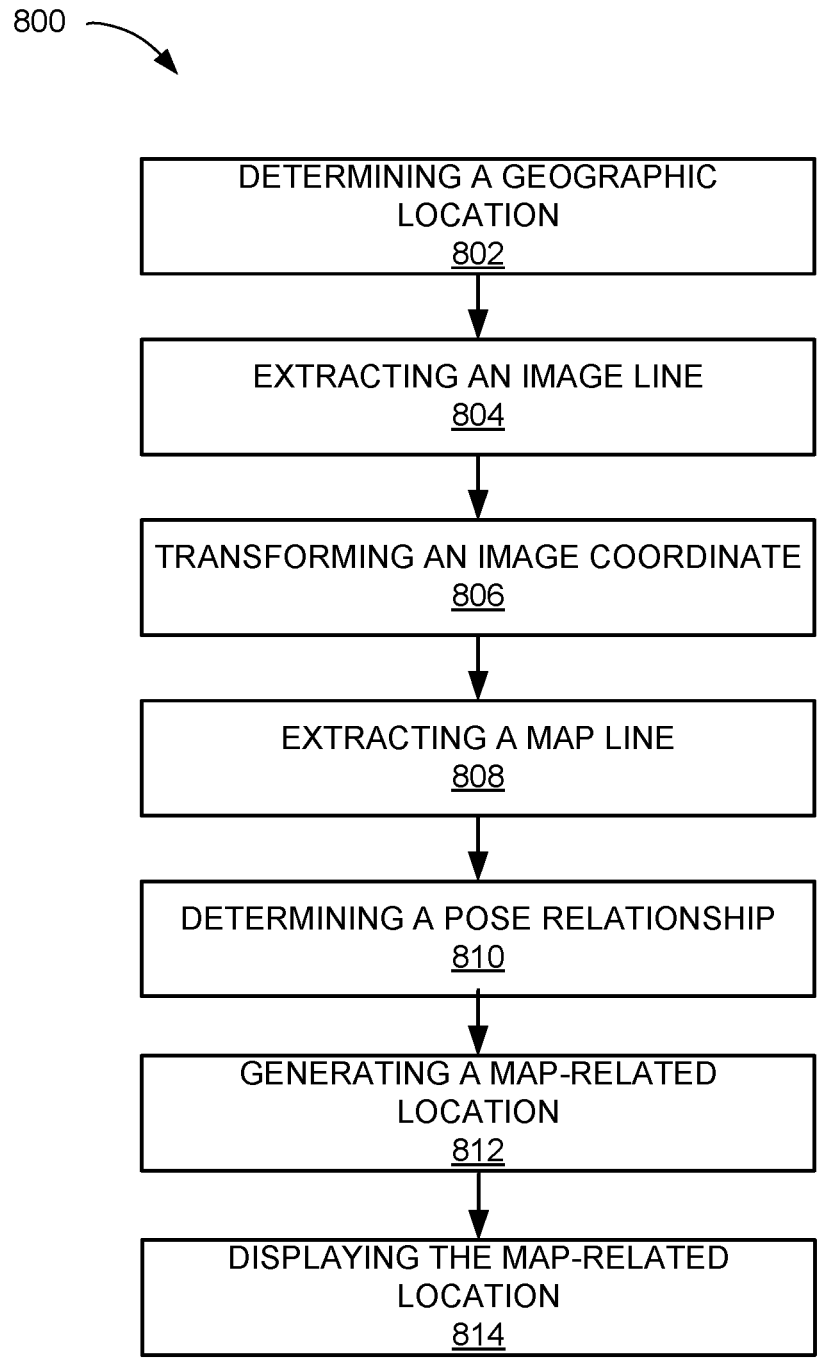
FIG. 8 is a flow chart of a method of operation of a navigation system in an embodiment of the present invention.

Referring now to FIG. 8, therein is shown a flow chart of a method 800 of operation of a navigation system 100 of FIG. 1 in an embodiment of the present invention. The method 800 includes: determining a geographic location, of a vehicle, while a global positioning location is blocked by an obstruction and the geographic location is from an in-vehicle location sensor in the vehicle a block 802; extracting an image line from a surrounding image with an artificial intelligence model and the surrounding image is from an in-vehicle image sensor in the vehicle in a block 804; transforming an image coordinate of the image line to a world coordinate of a proximity map based on the geographic location in a block 806; extracting a map line from the proximity map based on the world coordinate in a block 808; determining a pose relationship between the image line and the map line paired as either horizontal or vertical in a block 810; generating a map-related location for the vehicle based the geographic location in a block 812; and communicating the map-related location for displaying on a user interface in a block 814.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation for a navigation system comprising:
    determining a geographic location, of a vehicle, when a global positioning location is blocked by an obstruction, wherein the geographic location is determined by an in-vehicle location sensor;
    extracting an image line from a surrounding image by using an artificial intelligence model, wherein the surrounding image is from an in-vehicle image sensor;
    transforming an image coordinate of the image line to a world coordinate of a proximity map from a high definition (HD) map local storage based on the geographic location;
    extracting a map line from the HD map local storage based on the world coordinate;
    determining a pose relationship between the image line and the map line, wherein the image line and the map line are paired and classified as either horizontal or vertical;
    generating a map-related location for the vehicle based on both the geographic location and the pose relationship; and
    communicating the map-related location for displaying on a user interface.

2. The method as claimed in claim 1, wherein generating the map-related location for the vehicle includes fusing the geographic location based on the in-vehicle location sensor, and the pose relationship matched on the proximity map of the HD map local storage.

3. The method as claimed in claim 1, wherein determining the pose relationship between the image line and the map line paired as either horizontal or vertical includes:
    determining the image line as vertical when an image slope of the image line is above a threshold; and determining the image line as horizontal when the image slope of the image line is less than or equal to the threshold.

4. The method as claimed in claim 1, wherein transforming the image coordinate of the image line to the world coordinate of the proximity map of the HD map local storage includes transforming the image coordinate of the image line to the world coordinate of the HD map local storage based on an in-vehicle image sensor calibration of the in-vehicle image sensor.

5. The method as claimed in claim 1, wherein extracting the map line from proximity map of the HD map local storage based on the world coordinate includes matching the map line and the image line.

6. The method as claimed in claim 1, wherein generating the map-related location for the vehicle includes improving the geographic location for the vehicle.

7. The method as claimed in claim 1, wherein extracting the map line from proximity map of the HD map local storage based on the world coordinate includes extracting the map line from the proximity map of the HD map local storage based on the world coordinate, wherein the proximity map is a portion of the HD map local storage that is created based on a predefined distance from the geographic location.

8. A navigation system comprising:
a control circuit configured to:
determine a geographic location, of a vehicle, when a global positioning location is blocked by an obstruction, wherein the geographic location is determined by an in-vehicle location sensor,
extract an image line from a surrounding image by using an artificial intelligence model, wherein the surrounding image is from an in-vehicle image sensor,
transform an image coordinate of the image line to a world coordinate of a proximity map of a high definition (HD) map local storage based on the geographic location,
extract a map line from the HD map local storage based on the world coordinate,
determine a pose relationship between the image line and the map line, wherein the image line and the map line are paired and classified as either horizontal or vertical, and
generate a map-related location for the vehicle based on both the geographic location and the pose relationship; and
an interface circuit configured to communicate the map-related location for display on a user interface.

9. The system as claimed in claim 8, wherein the control circuit configured to generate the map-related location for the vehicle includes fusing the geographic location, based on the in-vehicle location sensor, and the pose relationship matched on the proximity map of the HD map local storage.

10. The system as claimed in claim 8, wherein the control circuit configured to determine the pose relationship between the image line and the map line paired as either horizontal or vertical includes:
determine the image line as vertical when an image slope of the image line is above a threshold; and
determine the image line as horizontal when the image slope of the image line is less than or equal to the threshold.

11. The system as claimed in claim 8, wherein the control circuit configured to transform the image coordinate of the image line to the world coordinate of the HD map local storage includes transforming the image coordinate of the image line to the world coordinate of the HD map local storage based on an in-vehicle image sensor calibration of the in-vehicle image sensor.

12. The system as claimed in claim 8, wherein the control circuit configured to extract the map line from the HD map local storage based on the world coordinate includes matching the map line and the image line.

13. The system as claimed in claim 8, wherein the control circuit configured to generate the map-related location for the vehicle includes improving the geographic location for the vehicle.

14. The system as claimed in claim 8, wherein the control circuit configured to extract the map line from the HD map local storage based on the world coordinate includes extracting the map line from a proximity map of the HD map local storage based on the world coordinate, wherein the proximity map is a portion of the HD map local storage that is created based on a predefined distance from the geographic location.

15. A non-transitory computer readable medium including instructions for a navigation system comprising:
determining a geographic location, of a vehicle, when a global positioning location is blocked by an obstruction, wherein the geographic location is determined by an in-vehicle location sensor;
extracting an image line from a surrounding image by using an artificial intelligence model, wherein the surrounding image is from an in-vehicle image sensor;
transforming an image coordinate of the image line to a world coordinate of proximity map of a high definition (HD) map local storage based on the geographic location;
extracting a map line from the HD map local storage based on the world coordinate;
determining a pose relationship between the image line and the map line, wherein the image line and the map line are paired and classified as either horizontal or vertical;
generating a map-related location for the vehicle based on both the geographic location and the pose relationship; and
communicating the map-related location for displaying on a user interface.

16. The non-transitory computer readable medium including the instructions as claimed in claim 15, wherein generating the map-related location for the vehicle includes fusing the geographic location, based on the in-vehicle location sensor, and the pose relationship matched on the proximity map of the HD map local storage.

17. The non-transitory computer readable medium including the instructions as claimed in claim 15, wherein determining the pose relationship between the image line and the map line paired as either horizontal or vertical includes:
determining the image line as vertical when an image slope of the image line is above a threshold; and
determining the image line as horizontal when the image slope of the image line is less than or equal to the threshold.

18. The non-transitory computer readable medium including the instructions as claimed in claim 15, wherein transforming the image coordinate of the image line to the world coordinate of the HD map local storage includes transforming the image coordinate of the image line to the world coordinate of the HD map local storage based on an in-vehicle image sensor calibration of the in-vehicle image sensor.

19. The non-transitory computer readable medium including the instructions as claimed in claim 15, wherein extracting the map line from the HD map local storage based on the world coordinate includes matching the map line and the image line.

20. The non-transitory computer readable medium including the instructions as claimed in claim 15, wherein generating the map-related location for the vehicle includes improving the geographic location for the vehicle.

* * * * *